United States Patent Office 3,124,555
Patented Mar. 10, 1964

3,124,555
STABILIZATION OF POLYOLEFINS
Delos E. Bown and Henry G. Schutze, Baytown, Tex.,
assignors, by mesne assignments, to Esso Research and
Engineering Company, Elizabeth, N.J., a corporation
of Delaware
No Drawing. Filed Apr. 4, 1961, Ser. No. 100,539
20 Claims. (Cl. 260—45.5)

The present invention is directed to a polyolefin composition. More particularly, the invention is concerned with a composition including polyolefins which are stable against heat and color degradation. In its more specific aspects, the invention is concerned with a polyolefin composition such as polypropylene which does not deteriorate in molecular weight or exhibit discoloration.

The present invention may be briefly described as a composition comprising a major amount of a solid polymer of an alpha olefin having 2 to 8 carbon atoms in the molecule, and a minor but sufficient amount of a resinous solid prepared by a reaction of a phenol with a cycloalkylpolyene or a polycycloalkylpolyene in the presence of an acidic condensing agent. The reaction is preferably carried out in solution in a hydrocarbon selected from the aromatic, naphthenic and paraffinic hydrocarbons boiling in the range of about 100° to about 400° F. at a temperature within the range from about 5° to about 75° C. in the presence of boron trifluoride etherate as the acidic condensing agent or catalyst.

It is contemplated that a costabilizer may be used in the composition and such costabilizers may be exemplified by dilaurylthiodipropionate, dicetyl sulfide, bis(tetradecylmercapto) - p - xylylene, bis(octadecylmercapto)-p-xylylene, and other compounds such as 19,25-dithiohentetetracontane and 19,24-dithiotetracontane.

It is contemplated in the practice of the present invention that zinc salts of a fatty acid may also be used. Exemplary of the zinc salts may be mentioned zinc hexanoate and the like. Other specific zinc salts finding use in the present invention are zinc 2-ethylhexanoate, zinc stearate, and zinc propionate.

The resinous solid may be employed in amounts in the range from about 0.05 to about 1.0 percent by weight of the solid polymer. An amount in the range of about 0.2 to about 0.5 percent by weight may be preferred.

The costabilizer may also be employed in the range from about 0.1 to about 1.0 percent by weight of the solid polymer with an amount in the range from about 0.2 to about 0.5 percent by weight preferred.

The zinc salt may be used in an amount in the range from about 0.01 to about 1.0 percent by weight of the solid polymer with an amount in the range from about 0.02 to about 0.1 percent by weight preferred.

The resinous solid is obtained by reacting a phenol with a cycloalkylpolyene or a polycycloalkylpolyene in solution in a hydrocarbon in the presence of boron trifluoride etherate as an acidic condensing agent.

Temperatures employed in producing the resinous solid may range from about 5° to about 75° C. with preferred temperatures being in the range from about 10° to about 40° C. with quite satisfactory results obtaining at 25° C.

Pressures to be employed may be sufficient to maintain a liquid phase in the reactants. A suitable pressure may range from about atmospheric pressure to about 100 p.s.i.

The cycloalkylpolyenes or polycycloalkylpolyenes employed in the practice of the present invention may include dicyclopentadiene, and other polycyclopentadienes; methylcyclopentadiene dimer; cyclododecatriene; the cyclohexadienes, either as the monomer or dimers, etc.; and the compounds such as cyclohepta- and cyclooctadiene and triene.

The phenolic compounds which may be used may include the mono-nuclear phenols, as well as the alkylated phenols such as the several cresols as exemplified by ortho-, meta- and para-, the dimethyl phenols, butylmethyl phenol, methylethyl phenol, propylmethyl phenol, and the like. Other phenols may also be used such as the isoalkylidene bisphenols. Examples of these isoalkylidene bisphenols are the bisphenols having the general structural formula of:

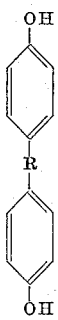

where R is an alkyl radical having from 3 to 16 carbon atoms.

Specific isoalkylidene bisphenols which have been found useful are 4,4'-isopropylidene bisphenol, 4,4'-butylidene bis(3-methyl-6-t-butylphenol), 4,4'-isopropylidene bis(2-isopropylphenol), 4,4'-methylene bis(3-methyl-6-t-butylphenol) and many other isoalkylidene bisphenols satisfying the formula given before. It is also contemplated that the phenol may be a polynuclear phenol as may be desired.

The ratio of the cycloalkylpolyene or polycycloalkylpolyene to phenol may suitably be in the range from about 1:4 to about 4:1 with a preferred ratio of about 2:1 to about 1:2 being used.

The solvents employed in the practice of the present invention are suitably hydrocarbons boiling in the range of from about 100° to about 400° F. and may include the purified hydrocarbons or fractions boiling within this range; speaking generally, the $C_5$ to $C_{12}$ hydrocarbons may be used. These compounds are the single ring aromatic hydrocarbons, naphthenic hydrocarbons and paraffinic hydrocarbons. As exemplary of the aromatic hydrocarbons may be mentioned specifically benzene, toluene, xylene, polyalkyl benzene such as trimethyl benzene, tetramethyl benzene and the like. The naphthenes may suitably include cyclohexane, cycloheptane, and the other members of the homologous series. The paraffins include hexane, heptane, octane, nonane, decane and the like. It is contemplated that the isomeric benzenes boiling in this range may be used. Other suitable solvents may be chlorinated hydrocarbons such as 1,2-dichloroethane.

The ratio of solvent to reactants, specifically the ratio of solvent to phenol and cycloalkylpolyene, may suitably range from about 1:5 to about 5:1 with a preferred ratio within the range from about 1:2 to about 1:1.

The acidic condensing agent preferably used in making up the resinous solids is preferably boron trifluoride etherate. Other acidic condensing catalysts may be used such as sulfuric acid, phosphoric acid, and acid-activated clays, and the like. Boron trifluoride etherate is preferred because formation of undesirable side products is minimized, color is improved and the catalyst is easily removed. This acidic condensing catalyst is used in a ratio of acidic condensing catalyst to reactants in the range of about 0.5:100 to about 10:100 with a preferred ratio in the range of about 1:100 to about 5:100.

It has been found that certain polyolefin polymers when exposed to oxygen or heat will degrade or deteriorate, forming color and losing molecular weight. In accordance with the present invention, the resinous solid mentioned herein supra, prevents color loss and deterioration of molecular weight due to exposure to oxidative conditions.

The polyolefin polymers in accordance with the present invention are polymers of alpha olefins having 2 to 8 carbon atoms in the molecule and may suitably be exemplified by polyethylene, polypropylene, ethylene-propylene copolymers, ethylene-butene-1 copolymers, ethylene-pentent-1 copolymers, and the like, having molecular weights in the range from about 10,000 to about 1,000,000. These polymers are produced by polymerization of the corresponding olefins employing the Ziegler type polymerization catalyst which is obtained by at least partially reducing in solution in a diluent a halide of an amphoteric metal selected from groups IVB, VB, VIB, and VIII of the periodic system of elements (see, for example, the Henry D. Hubbard Periodic Chart of the Elements, 1947 ed. revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, the amphoteric metal halide is reduced in solution in a nonreactive, nonpolar organic diluent in any suitable manner, such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and the at least partially reduced amphoteric metal halide, is employed as the medium in which olefin polymerization is effected.

The diluent to be employed should be a nonreactive, nonpolar organic medium in which the amphoteric metal halide starting material is soluble to an extent at least sufficient to provide a 0.1 weight percent solution of amphoteric metal halide starting material. Thus, for example, in preparing the polymerization medium, a 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.) gas oil distillate fractions obtained from the catalytic cracking of virgin gas oil feed stocks, diesel oil, etc. It will be understood that, if desired, mixtures of two or more compatible, miscible diluents may be employed. The diluent should be substantially completely free from oxygen, water and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about −60° to about 400° F., preferably at about room temperature. Higher temperatures may be employed, but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are required, although reaction time may vary within the range of about 10 minutes to about 24 hours.

As a result of subjecting the olefins of the type illustrated before to treatment with a catalyst of the nature described, olefin polymers are formed having the molecular weights recited which are essentially insoluble in the nonpolar organic liquid and form a slurry of polymerized olefins in the nonpolar organic liquid. It is these polymers, after quenching to deactivate any catalyst and separation from the slurry, which are treated by adding the resinous solid and optionally the other additives in accordance with the present invention since the polymer particles as produced may be in a finely divided state, have a high surface area and, therefore, rapidly adsorb oxygen.

In order to illustrate the invention further, the resinous solid of the present invention is prepared as follows:

In a three-neck round bottom flask equipped with a stirrer, a dropping funnel, a thermometer and a nitrogen blanket, was placed 54 gms. (0.5 mole) of meta-cresol and 150 ml. of normal heptane. While stirring, 4.5 ml. of $BF_3$—$Et_2O$ was added, followed by the dropwise addition of 132 gms. (1.0 mole) of dicyclopentadiene. The temperature was maintained at room temperature, 25° C., with an ice-water bath. The time of addition of the dicyclopentadiene was one-half hour and the solution was stirred an additional two hours. The first addition of dicyclopentadiene caused the solution to turn to a light orange color which remained without appreciable darkening until the reaction was quenched. After the two-hour holding time, 100 to 150 ml. of water was added to the reaction flask and the stirring continued for several minutes. The orange color disappeared and there was obtained a colorless oil. The contents of the reactor were transferred to a separatory funnel and the oil layer washed with water until the water layer was neutral (required three 200 ml. portions), the colorless oil layer was dried over Drierite, filtered, and the solvent removed on a Rinco rotating evaporator. The resulting colorless oil was distilled at 3–4 mm. to a top vapor temperature of 185° C. There was recovered as distillation bottoms the desired product, 99.7 gms. of a very light yellow resinous solid.

Various resinous solids were prepared as has been described. Table I sets out the type of phenol, the specific cycloalkylpolyene or polycycloalkylpolyene, the amounts of reactants, acidic condensing agent, solvent, reaction time, and holding time, together with the yield and other pertinent information.

TABLE I

| Phenol | Mols | Gms. | Cycloalkylpolyene | Mols | Gms. | BF₃–Et₂O, ml. | Solvent/ml. | Reaction Temp., °C. | Addition Time, Hours | Holding Time, Hours | Yield |
|---|---|---|---|---|---|---|---|---|---|---|---|
| Phenol | 0.5 | 47 | Dicyclopentadiene | 1.1 | 145 | 4.5 | Benzene 125 | 25 | 2 | 15 | 81 |
| Do | 1.0 | 94 | do | 1.0 | 132 | 4.5 | Benzene 200 | 25 | 3 | 3 | 121 |
| Do | 1.0 | 94 | do | 0.5 | 66 | 4.5 | do | 25 | 3 | 3 | 68 |
| Do | 1.0 | 94 | do | 0.5 | 66 | 4.5 | do | 10 | 3 | 15 | 73 |
| Do | 0.5 | 47 | do | 1.0 | 132 | 1.0 | Heptane 150 | 25 | ½ | ¾ | 50 |
| o-Cresol | 0.5 | 54 | do | 1.0 | 132 | 2.2 | Hexane 200 | 10 | ¾ | ½ | 33 |
| m-Cresol | 0.5 | 54 | do | 1.0 | 132 | 4.5 | Benzene 125 | 25 | ½ | 3½ | 119 |
| Do | 0.5 | 54 | do | 1.0 | 132 | 4.5 | Heptane 150 | 25 | ½ | 2 | 100 |
| Do | 0.5 | 54 | do | 1.0 | 132 | 2.2 | do | 25 | 1 | 1½ | 75 |
| Do | 1.0 | 108 | do | 2.0 | 264 | 4.5 | Hexane 300 | 25 | 2 | 2 | 194 |
| p-Cresol | 1.0 | 108 | do | 1.0 | 132 | 4.5 | Benzene 125 | 25 | 1 | 3 | 84 |
| Do | 0.5 | 54 | do | 0.5 | 66 | 2.2 | Heptane 150 | 10 | 1½ | 1½ | 24 |
| 2,6-Dimethylphenol | 0.5 | 61 | do | 1.0 | 132 | 4.5 | Benzene 150 | 25 | 1 | 3 | 109 |
| 2,4-Dimethylphenol | 0.5 | 61 | do | 1.0 | 132 | 2.2 | Hexane 150 | 25 | 2 | 4 | 48 |
| 3,4-Dimethylphenol | 0.5 | 61 | do | 1.0 | 132 | 2.2 | do | 40 | ¾ | 13 | 110 |
| 2-t-Butyl-5-methylphenol | 0.5 | 82 | do | 1.0 | 132 | 2.2 | do | 25 | 1½ | 2 | 95 |
| Phenol | 1.0 | 94 | Methylcyclopentadiene dimer | 0.5 | 80 | 4.5 | Benzene 200 | 10 | 1 | 3 | 51 |
| Do | 0.5 | 47 | Cyclo-dodecatriene | 0.5 | 81 | 4.5 | Benzene 125 | 25 | 2 | 15 | 48 |
| m-Cresol | 0.5 | 54 | do | 1.0 | 162 | 4.5 | Hexane 150 | 25 | 2 | 15 | 92 |
| Phenol | 0.5 | 47 | 4-Vinyl-cyclohexene | 1.1 | 119 | 4.5 | Heptane 125 | 25 | 2 | 3 | 81 |

The products produced as shown in Table I were then employed as additives to stabilize polypropylene which contained a costabilizer, dilaurylthiodipropionate. These results are shown in Table II.

TABLE II

| Sample No. | Stabilizer [a] | Oxidative Stability,[b] Days |
|---|---|---|
| 541 | Phenol and Dicyclopentadiene reaction product | 62 |
| 643 | do | [c](77) |
| 642 | do | [c](77) |
| 646 | do | 71 |
| 684 | do | 29 |
| 769 | o-Cresol and Dicyclopentadiene reaction product | [c](28) |
| 676 | m-Cresol and Dicyclopentadiene reaction product | 42 |
| 688 | do | 39 |
| 683 | do | 32 |
| 675 | p-Cresol and Dicyclopentadiene reaction product | 67 |
| 685 | do | 27 |
| 678 | 2,6-Dimethylphenol and Dicyclopentadiene reaction product | 77 |
| 702 | 2,4-Dimethylphenol and Dicyclopentadiene reaction product | 23 |
| 703 | 3,4-Dimethylphenol and Dicyclopentadiene reaction product | 31 |
| 704 | 2-t-Butyl-5-Methylphenol and Dicyclopentadiene reaction product | 14 |
| 654 | Phenol and Methylcyclopentadiene Dimer reaction product | 40 |
| 547 | Phenol and Cyclododecatriene reaction product | 33 |
| 762 | m-Cresol and Cyclododecatriene reaction product | [c](28) |
| 535 | Phenol and 4-Vinylcyclohexene reaction product | 39 |
| OTHER STABILIZERS | | |
| 398 | Dipinene Diphenol | 68 |
| 389 | Argus D (commercial Product of the Argus Chemical Company) | 42 |

[a] All samples were prepared with polypropylene and contained 0.3% dilaurylthiodipropionate, 0.1% of the stabilizer shown.
[b] 303° F., 10 cc. air/min.
[c] Sample on test, no evidence of breakdown.

Referring to Table II, there is also given the comparative results with dipinene diphenol and Argus D, the latter being a commercially available stabilizer. Referring to the results in Table II, it will be clear that the resinous product of the present composition provides oxidative stability to the polyolefin and is superior to the commercially available stabilizer and is at least equal to dipinene diphenol, another very good stabilizer.

To illustrate the invention further, compositions were made up, to which were added small quantities of zinc salts with the results of the tests of these compositions being shown in Table III.

TABLE III

| Sample No. | Stabilizer [a] | Color of Polymer Pad | Oxidative Stability,[b] Days |
|---|---|---|---|
| 688 | m-Cresol and Dicyclopentadiene reaction product | Off White | 39 |
| 705 | Sample No. 688 with 0.02% Zinc 2-Ethylhexanoate | White | 36 |
| 541 | Phenol and Dicyclopentadiene reaction product | Light Grey | 62 |
| 706 | Sample No. 541 with 0.02% Zinc 2-Ethylhexanoate | White | [c](35) |

[a] All samples were prepared with polypropylene and contained 0.3% dilaurylthiodipropionate, 0.1% of the stabilizer shown.
[b] 303° F., 10 cc. air/min.
[c] Still under test, no evidence of breakdown.

It will be clear from the data in Table III that the zinc salts further stabilize the color of the polymer samples.

Additional runs were made in which the phenols employed were the isoalkylidene bisphenols. These operations are shown in the following examples:

*Example 1*

In a three-neck round-bottom flask equipped with a stirrer, a dropping funnel, a thermometer, and a nitrogen blanket, was placed 45.6 gms. (0.2 mole) of 4,4'-isopropylidene bisphenol dissolved in 150 ml. of benzene. While stirring, 4.5 ml. of BF₃—Et₂O was added, followed by the dropwise addition of 52.8 gms. (0.4 mole) of dicyclopentadiene. The temperature was maintained at 50° C. The time of addition was one hour, and the solution was stirred at 50° C. for an additional two hours. The contents of the reactor, an orange-colored solution, was transferred to a separatory funnel and washed with three 400 ml. portions of hot water. The oil layer, now a light yellow color, was dried over Drierite, filtered, and the solvent removed on a Rinco rotating evaporator. The resulting light yellow oil was distilled at 3–4 mm. to a top vapor temperature of 185° C. There was recovered as distillation bottoms, the desired product, 76.3 gms. of a light yellow resinous solid.

*Example 2*

The same procedure was used as in Example 1, using 76.4 gms. (0.2 mole) of 4,4'-butylidene bis(3-methyl-6-t-butylphenol), 150 ml. of benzene, 2.2 ml. of BF₃—Et₂O, and 52.8 gms. (0.4 mole of dicyclopentadiene. There was recovered as distillation bottoms, 47.1 gms. of a light brown resinous solid.

*Example 3*

The same procedure was used as in Example 1, using 62.4 gms. (0.2 mole) of 4,4'-isopropylidene bis(2-isopropylphenol), 150 ml. of benzene, 2.2 ml. of $BF_3$—$Et_2O$, and 52.8 gms. (0.4 mole) of dicyclopentadiene. The reaction temperature was 25° C. There was recovered as distillation bottoms, 82.1 gms. of a light brown resinous solid.

*Example 4*

The same procedure was used as in Example 1, using 34.0 gms. (0.1 mole) of 4,4'-methylene bis(3-methyl-6-t-butylphenol), 150 ml. of benzene, 2.2 ml. of $BF_3$-$Et_2O$, and 26.4 gms. (0.2 mole) of dicyclopentadiene. The reaction temperature was 25° C. Three 400 ml. portions of cold water were used in the washing. There was recovered as distillation bottoms, 41.7 gms. of a yellow resinous solid.

The products from Examples 1 to 4, inclusive, were then added to solid polypropylene along with other additives. These results are shown in Table IV.

TABLE IV

| Sample Number | Stabilizer System a | Wt. Percent | Oxidative Stability,b Days |
|---|---|---|---|
| 673 | Dilaurylthiodipropionate, Example 1. | 0.3, 0.1 | 89 |
| 770 | Dilaurylthiodipropionate, Example 1, zinc 2-Ethylhexanoate. | 0.3, 0.1, 0.5 | c(28) |
| 674 | Bis (tetradecylmercapto)-p-xylylene, Example 1. | 0.3, 0.1 | 61 |
| 700 | Dilaurylthiodipropionate, Example 2. | 0.3, 0.1 | 33 |
| 701 | Dilaurylthiodipropionate, Example 3. | 0.3, 0.1 | c(84) |
| 754 | Dilaurylthiodipropionate, Example 4. | 0.3, 0.1 | 23 | a The polymer used was polypropylene.
b 303° F., 10 cc. air/min.
c Still under test, no evidence of breakdown.

These results show that the solid resinous product formed by reacting cycloalkylpolyene with isoalkylidene bisphenol is an excellent stabilizer for polyolefins, such as solid polypropylene, and the like.

In adding the solid resinous product, the costabilizer, and the zinc salt to the polyolefin composition, the additives may suitably be employed and incorporated in the polyolefin by forming a solution of the particular additives in a suitable solvent such as an aromatic hydrocarbon. The resinous compound may suitably be added in a solvent, such as xylene, hexane, or cyclohexane, while the costabilizer may suitably be employed in a suitable solvent, such as methanol, xylene, hexane, etc. The additives may be sprayed over the pellets or particles and the resulting mixture may then be extruded through a suitable extrusion device to cause the formation of a homogeneous mixture. While it is preferred to add the additives to the polyolefins in a solution, the additives may be added as such to the polymer particles and the resulting mixture subjected to milling or extrusion, as desired, to cause intimate admixture of the additives with the polymer composition to form a homogeneous mixture.

The present invention is quite important and useful in that the composition of the present invention may be used in formation of products, such as molded and extruded devices and articles, or the composition may be formed into films for use in wrapping foodstuffs and other articles, or the polymer composition may be extruded as a filament for use in forming of cloths, fibers and other similar materials.

The nature and objects of the present invention having been completely described and illustrated, what we wish to claim as new and useful and secure by Letters Patent is:

1. A composition comprising a solid polymer of an alpha mono-olefin having 2 to 8 carbon atoms in the molecule and a stabilizing amount of resinous solid distillation bottoms product obtained in the reaction of a phenol with a cycloalkylpolyene in solution in a hydrocarbon selected from the aromatic, naphthenic and paraffinic hydrocarbons, boiling in the range from about 100° F. to about 400° F., at a temperature within the range from about 5° to about 75° C. in the presence of an acidic condensing catalyst.

2. A composition in accordance with claim 1 in which the polymer is polyethylene.

3. A composition in accordance with claim 1 in which the polymer is polypropylene.

4. A polymer in accordance with claim 1 in which the cycloalkylpolyene is dicyclopentadiene.

5. A composition in accordance with claim 1 in which the cycloalkylpolyene is the dimer of methylcyclopentadiene.

6. A composition in accordance with claim 1 in which the cycloalkylpolyene is cyclododecatriene.

7. A composition in accordance with claim 1 in which the phenol is a mono-phenol.

8. A composition in accordance with claim 1 in which the phenol is an isoalkylidene bisphenol.

9. A composition in accordance with claim 1 in which the phenol is a cresol.

10. A composition in accordance with claim 1 in which the phenol is meta-cresol.

11. A composition in accordance with claim 1 in which a zinc salt of a fatty acid is present.

12. A composition in accordance with claim 1 in which the phenol is 4,4'-isopropylidene bisphenol.

13. A composition in accordance with claim 1 in which the phenol is 4,4'-butylidene bis(3-methyl-6-t-butylphenol).

14. A composition in accordance with claim 1 in which the phenol is 4,4'-isopropylidene bis(2-isopropylphenol).

15. A composition in accordance with claim 1 in which the phenol is 4,4'-methylene bis(3-methyl-6-t-butylphenol).

16. A composition comprising a major amount of solid polypropylene and an amount within the range from about 0.05 to about 1.0 percent by weight of a resinous solid distillation bottoms product obtained in the reaction of a phenol with a cycloalkylpolyene in solution in a hydrocarbon selected from the aromatic, naphthenic, and paraffinic hydrocarbons, boiling within the range of 100° F. to about 400° F., and at a temperature from about 5° to about 75° C. in the presence of boron trifluoride etherate.

17. A composition comprising a major amount of polypropylene and a minor amount within the range from about 0.05 to about 1.0 percent by weight of a resinous solid distillation bottoms product obtained in the reaction of a phenol with a cycloalkylpolyene in a solution in a hydrocarbon selected from the aromatic, naphthenic and paraffinic hydrocarbons, boiling in the range from about 100° F. to about 400° F., at a temperature within the range from about 5° to about 75° C. in the presence of boron trifluoride etherate, the ratio of cycloalkylpolyene to phenol being in the range from about 1:4 to 4:1; the ratio of solvent to phenol and cycloalkylpolyene being within the range from about 1:5 to about 5:1; and the ratio of boron trifluoride etherate to phenol and cycloalkylpolyene being within the range of about 0.5:100 to about 10:100.

18. A composition in accordance with claim 17 in which the cycloalkylpolyene is dicyclopentadiene.

19. A composition in accordance with claim 17 in which the cycloalkylpolyene is the dimer of methylcyclopentadiene.

20. A composition in accordance with claim 17 in which the cycloalkylpolyene is cyclododecatriene.

References Cited in the file of this patent

UNITED STATES PATENTS

| | | |
|---|---|---|
| 2,839,493 | Lambert et al. | June 17, 1958 |
| 2,864,868 | Bader | Dec. 16, 1958 |
| 2,911,387 | Vandenberg | Nov. 3, 1959 |